United States Patent
Przebindowska et al.

(10) Patent No.: US 10,782,433 B2
(45) Date of Patent: Sep. 22, 2020

(54) METHOD FOR AN AUTOMATIC DETECTION OF ACOUSTIC REFLECTORS AND THEIR PARAMETERS FROM BOREHOLE ACOUSTIC ARRAY DATA

(71) Applicant: Baker Hughes, a GE company, LLC, Houston, TX (US)

(72) Inventors: Anna Przebindowska, Celle (DE); Theodorus Geerits, Nienhagen (DE)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 15/662,015

(22) Filed: Jul. 27, 2017

(65) Prior Publication Data

US 2018/0031723 A1 Feb. 1, 2018

Related U.S. Application Data

(60) Provisional application No. 62/368,627, filed on Jul. 29, 2016.

(51) Int. Cl.
*G01V 1/50* (2006.01)
*G01V 1/46* (2006.01)

(52) U.S. Cl.
CPC ............... *G01V 1/50* (2013.01); *G01V 1/46* (2013.01); *G01V 2210/127* (2013.01); *G01V 2210/6161* (2013.01); *G01V 2210/6169* (2013.01)

(58) Field of Classification Search
CPC .... G01V 1/50; G01V 1/46; G01V 2210/6169; G01V 2210/6161; G01V 2210/127

USPC ........................................................... 367/25
See application file for complete search history.

(56) References Cited

U.S. PATENT DOCUMENTS

| | | | |
|---|---|---|---|
| 3,764,968 A | 10/1973 | Anderson | |
| 3,958,217 A | 5/1976 | Spinnler | |
| 4,351,037 A | 9/1982 | Scherbatskoy | |
| 4,594,691 A * | 6/1986 | Kimball | ............ G01V 1/48 367/26 |
| 4,649,525 A | 3/1987 | Angona et al. | |
| 4,953,595 A | 9/1990 | Kotlyar | |
| 5,678,643 A | 10/1997 | Robbins et al. | |

(Continued)

FOREIGN PATENT DOCUMENTS

WO 2009117305 A2 9/2009

*Primary Examiner* — Daniel L Murphy
(74) *Attorney, Agent, or Firm* — Mossman Kumar & Tyler PC

(57) ABSTRACT

Methods, systems, devices, and products for formation evaluation. Methods include automatically characterizing an acoustic reflective boundary in the earth formation by: generating a plurality of multipole acoustic signals within the borehole; generating acoustic wave data at at least one acoustic receiver on the logging tool in response to a plurality of acoustic reflections of acoustic waves from a corresponding plurality of reflection points along the boundary responsive to the multipole acoustic signals; estimating from the acoustic wave data a location in the formation for each reflection point of the plurality of reflection points, which may include performing coherence processing on at least a portion of the acoustic wave data to generate a coherence map; and identifying acoustic reflections from the coherence map; and using the location in the formation for each reflection point to estimate at least one property of the acoustic reflective boundary.

21 Claims, 11 Drawing Sheets

(56) References Cited

U.S. PATENT DOCUMENTS

| | | | |
|---|---|---|---|
| 5,892,732 A * | 4/1999 | Gersztenkorn | G01V 1/32 367/59 |
| 6,176,344 B1 | 1/2001 | Lester | |
| 6,898,150 B2 | 5/2005 | Hahn et al. | |
| 7,035,165 B2 | 4/2006 | Tang | |
| 7,417,920 B2 | 8/2008 | Hahn et al. | |
| 8,055,488 B2 | 11/2011 | Taki et al. | |
| 8,811,114 B2 | 8/2014 | Geerits et al. | |
| 2002/0093879 A1 | 7/2002 | Mandal | |
| 2003/0014190 A1 | 1/2003 | Dubinsky et al. | |
| 2006/0015257 A1 | 1/2006 | Hassan et al. | |

* cited by examiner

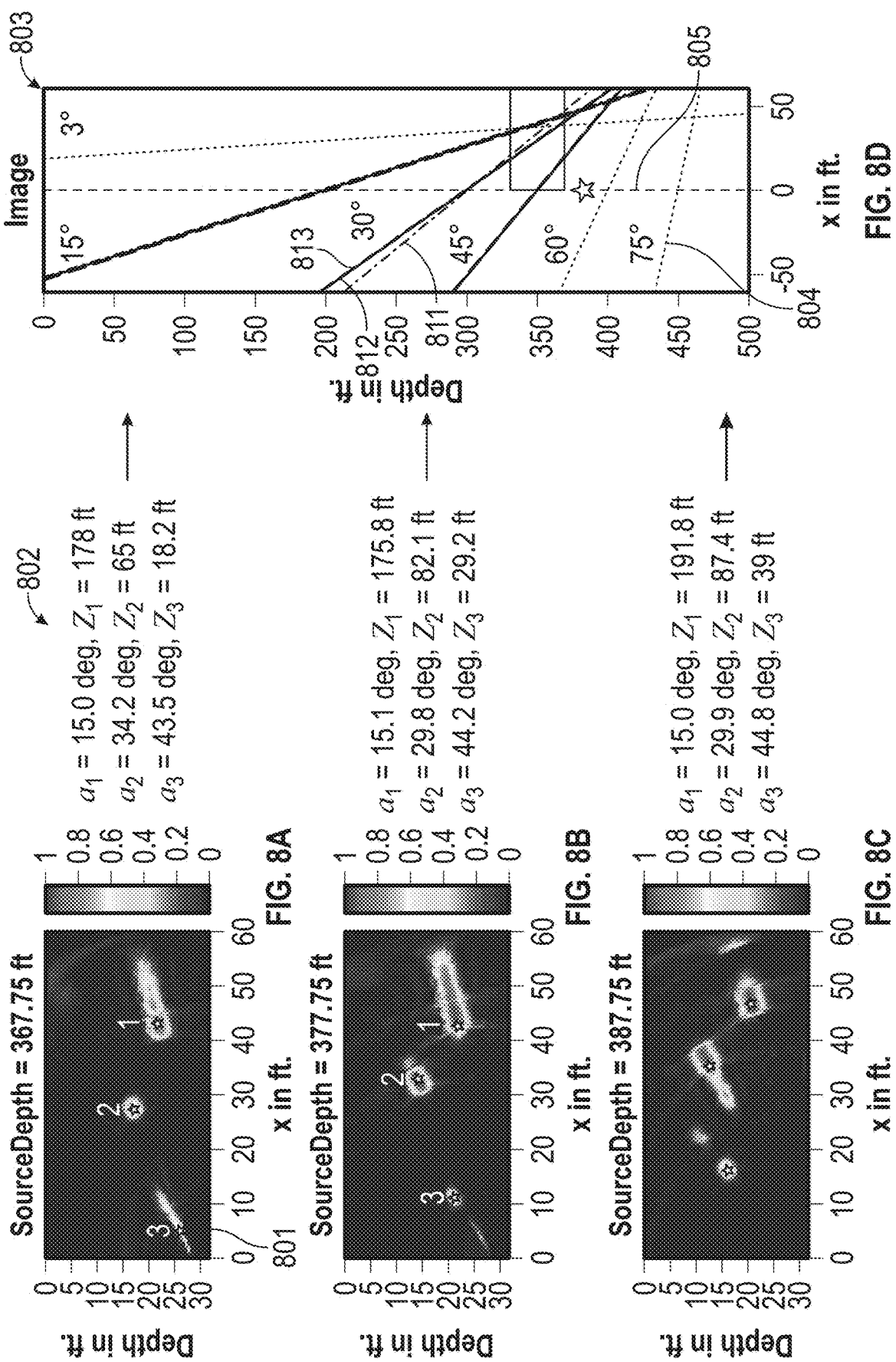

METHOD FOR AN AUTOMATIC DETECTION OF ACOUSTIC REFLECTORS AND THEIR PARAMETERS FROM BOREHOLE ACOUSTIC ARRAY DATA

FIELD OF THE DISCLOSURE

This disclosure generally relates to borehole tools, and in particular to methods and apparatuses for conducting acoustic well logging.

BACKGROUND OF THE DISCLOSURE

Drilling wells for various purposes is well-known. Such wells may be drilled for geothermal purposes, to produce hydrocarbons (e.g., oil and gas), to produce water, and so on. Well depth may range from a few thousand feet to 25,000 feet or more. In hydrocarbon wells, downhole tools often incorporate various sensors, instruments, and control devices in order to carry out any number of downhole operations. Thus, the tools may include sensors and/or electronics for formation evaluation, monitoring and controlling the tool itself, and so on.

Drilling systems having an acoustic "logging-while-drilling" ('LWD') or "measurement-while-drilling" ('MWD') system as part of a bottomhole assembly, or an after-drilling wireline logging system having an acoustic device for measuring acoustic velocities of subsurface formations (during or after drilling of the wellbores) and determining the location of formation bed boundaries around the bottomhole assembly, as in the MWD system, or around the wireline logging system are known. Tools for imaging of acoustically reflective boundaries using directional acoustic sources are also known. For the purposes of this disclosure, the term "acoustically reflective boundary" is used to denote a geologic bed boundary, interface between layers having an acoustic impedance contrast, or a subsurface reflection point.

SUMMARY OF THE DISCLOSURE

In aspects, the present disclosure is related to methods and apparatus for performing formation evaluation in a borehole intersecting an earth formation, including estimating at least one parameter of interest relating to the formation, such as, for example, a property of an acoustically reflective boundary in the formation.

Methods may include automatically characterizing an acoustic reflective boundary in the earth formation by: generating a plurality of multipole acoustic signals within the borehole; generating acoustic wave data at at least one acoustic receiver on the logging tool in response to a plurality of acoustic reflections of acoustic waves from a corresponding plurality of reflection points along the boundary responsive to the multipole acoustic signals; estimating from the acoustic wave data a location in the formation for each reflection point of the plurality of reflection points; and using the location in the formation for each reflection point to estimate at least one property of the acoustic reflective boundary. Each acoustic reflection may be unique to a particular transmitter location and receiver location and a particular acoustic reflective boundary in the formation.

Estimating the location in the formation for each reflection point may include performing coherence processing on at least a portion of the acoustic wave data to generate a coherence map; and identifying acoustic reflections from the coherence map. Identifying the acoustic reflections may be carried out by identifying local maxima in the coherence map, wherein the local maxima are representative of the acoustic reflections. Estimating a location in the formation for each reflection point of the plurality of reflection points from the acoustic wave data may be free from acoustic migration of acoustic wave data.

Methods may include generating the acoustic wave data at at least one acoustic receiver on the logging tool in response to a plurality of acoustic reflections of acoustic waves from a corresponding second plurality of reflection points along a second boundary responsive to the multipole acoustic signals; estimating from the acoustic wave data a location in the formation for each reflection point of the second plurality of reflection points; and using the location in the formation for each reflection point to estimate at least one property of a plurality of acoustic reflective boundaries.

Methods may include estimating a local dip of the boundary about a particular reflection point using a location of a transmitter associated with the reflection point, a location of the receiver of the at least one acoustic receiver associated with the reflection point, and the location within the formation of the reflection point. Estimating the at least one property may include using the local dip to estimate a global dip of the reflective boundary and estimating at least one additional property, wherein the additional property comprises at least one of: i) an intersection angle between the borehole and the boundary; and ii) a distance of travel for the tool to meet the reflector-borehole intersection point. Methods may include transmitting formation information uphole. The formation information may represent at least one of: i) the location in the formation for each reflection point; and ii) the location of the acoustic reflective boundary; iii) an intersection angle between the borehole and the boundary; and iv) a distance of travel for the tool to meet a boundary-borehole intersection point. Methods may include receiving the formation information at the surface in near real-time with respect to initiating the generation of the plurality of multipole acoustic signals, and conducting further operations in the formation in dependence upon the formation information.

The further operations may include at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation information.

Methods described herein may be carried out using an acoustic well logging system. Aspects of the present disclosure include a well logging system for logging in a borehole intersecting an earth formation. Systems may include at least one transmitter in the borehole configured to generate a plurality of multipole acoustic signals; at least one receiver in the borehole configure to generate acoustic wave data in response to a plurality of acoustic reflections of acoustic waves from a corresponding plurality of reflection points along an acoustic reflective boundary in the earth formation responsive to the multipole acoustic signals; at least one processor on the tool. The processor may be configured to automatically characterize the boundary by: estimating from the acoustic wave data a location in the formation for each reflection point of the plurality of reflection points; and using the location in the formation for each reflection point to estimate a location of the acoustic reflective boundary.

The well logging system may include at least one acoustic logging tool configured to be conveyed into a borehole, wherein the at least one transmitter and the at least one receiver are disposed on the at least one logging tool.

Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 8A-8D illustrate partial results using only three example measurement points;

DETAILED DESCRIPTION

Figures 1A, 1B:
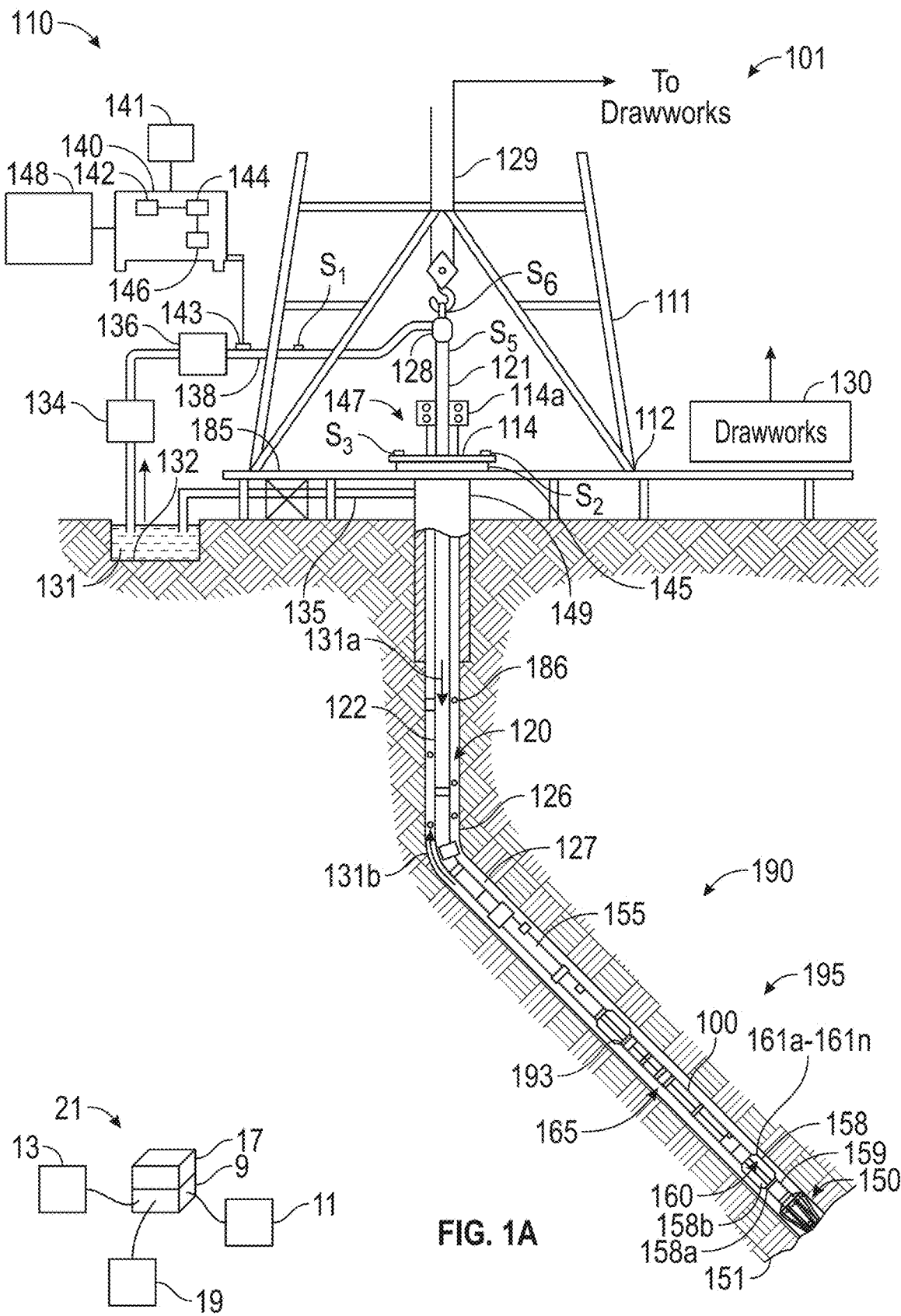
FIGS. 1A & 1B illustrate components of systems in accordance with embodiments of the present disclosure.

Aspects of the present disclosure relate to apparatus and methods for acoustic well logging, including measurement and interpretation of physical phenomena indicative of parameters of interest of the formation, the borehole, or the downhole fluids therein. Techniques described herein are particularly suited to automatic detection of acoustically reflective boundaries (referred to herein as 'reflectors' or 'boundaries'), e.g., geologic structures, and related parameters of interest (e.g., properties of these boundaries) from borehole acoustic array data. The term "reflector", is meant to include physical features (e.g., geologic structures such as fractures, faults, and bedding planes) which are associated with an elastic impedance contrast strong enough to generate reflected waves.

To obtain hydrocarbons such as oil and gas, boreholes (wellbores) are drilled through hydrocarbon-bearing subsurface formations. A large number of the current drilling activity involves drilling "horizontal" boreholes. Advances in logging-while-drilling and measurement-while-drilling ('LWD/MWD') measurement systems and drill bit steering systems disposed on a drill string enable drilling of the horizontal boreholes with enhanced efficiency and greater success. Recently, horizontal boreholes, extending several thousand meters ("extended reach" boreholes), have been drilled to access hydrocarbon reserves at reservoir flanks and to develop satellite fields from existing offshore platforms. Even more recently, attempts have been made to drill boreholes corresponding to three-dimensional borehole profiles. Such borehole profiles often include several builds and turns along the drill path. Such three-dimensional borehole profiles allow hydrocarbon recovery from multiple formations and allow optimal placement of wellbores in geologically intricate formations.

Hydrocarbon recovery may be maximized by drilling the horizontal and complex wellbores along optimal locations within the hydrocarbon-producing formations (payzones). Important to the success of these wellbores is to: (1) establish reliable stratigraphic position control while landing the wellbore into the target formation, and (2) properly navigate the drill bit through the formation during drilling. In order to achieve such wellbore profiles, it is important to determine the true location of the drill bit relative to the formation bed boundaries and boundaries between the various fluids, such as oil, gas and water. Lack of such information can lead to severe "dogleg" paths along the borehole resulting from hole or drill path corrections to find or to reenter the payzones. Such wellbore profiles usually limit the horizontal reach and the final wellbore length exposed to the reservoir.

Optimization of the borehole location within the formation can also have a substantial impact on maximizing production rates and minimizing gas and water coning problems. Steering efficiency and geological positioning are considered in the industry among the greatest limitations of the current drilling systems for drilling horizontal and complex wellbores. Availability of relatively precise three-dimensional subsurface acoustic maps, location of the drilling assembly relative to the bed boundaries of the formation around the drilling assembly can greatly enhance the chances of drilling boreholes for maximum recovery.

The emergence of modern borehole acoustic array tools has resulted in new applications such as single-well imaging ('SWI') of geologic structures up to tens of feet away from the borehole. This technique may provide valuable information about natural fracture systems, and detect sub-seismic scale faults and bedding planes. Techniques have been substantially improved over time. For example, an acoustic logging tool, such as an LWD or MWD acoustic tool, may now be configured to produce acoustic signals and subsequently record refracted and reflected signals of full wave modes (P, S and Stoneley travel time and wave amplitudes) in its memory. SWI may use these full wave mode signals as input. More recently, tools have been configured with azimuthal receivers evenly spaced around the tool's circumference in order to find an approximate direction of the compressional-wave reflections.

The Deep Shear Wave Imaging (DSWI) application developed by BAKER HUGHES INCORPORATED uses shear-wave reflected waves generated with a cross-dipole source, such as for example, the CROSS MULTIPOLE ARRAY ACOUSTILOG F1™ (the 'XMAC F1' tool) from BAKER HUGHES INCORPORATED, to create acoustic images in the near-borehole region.

However, there are a number of challenges associated with the single-well imaging, which make implementation more demanding than conventional imaging using surface seismic data. Acoustic waveform data are dominated by strong direct waves, which may have amplitudes several orders of magnitude higher than the reflected waves. Specific data processing techniques to enhance reflection data and suppress direct waves may be beneficial. Further, the very few receivers in an array and the limited acquisition aperture—the total length of the array of receivers may be only a few feet—present an important challenge for standard migration algorithms and lead to low-resolution images.

The data requirements of SWI can also be problematic, particularly with respect to MWD/LWD applications. SWI uses full waveform data as an input, whereas the large amount of raw acoustic data dramatically exceeds the real-time transmission capabilities of conventional mud pulse telemetry techniques, which often have an average transmission rate of approximately 10 bit/sec. For a number of reasons, in drilling-based systems mud-pulse telemetry is the most widely used method of communication with the surface.

A conventional refracted wave logs (e.g., slowness logs) dataset can be easily sent to the surface in real-time due to its relatively small size. Unfortunately, however, acoustic reflection images (that is, datasets comprising reflection data sufficient to characterize a boundary in the formation) are significantly larger. In practice, it has not been possible to send the reflection images to the surface for real-time applications due to limitations of mud pulse telemetry speed.

An LWD acoustic logging tool may acquire good acoustic records at ROPs of up to 100 feet per hour or more. Acoustic reflection imaging over the same interval may produce more than a half million bits of data. Mud pulse telemetry may operate on an average transmission rate of 10 bits/sec. However, the bandwidth is typically shared with other tools in the borehole. Thus, typical available bandwidth for acoustic reflection data is between 2 and 5 bits per second. Even at 10 bits/second, sending the uncompressed acoustic reflection data from the borehole to the surface would take more than 17 hours.

In contrast to conventional single-well imaging techniques, disclosed herein are methods which may include the use of computer-based algorithms configured for automatic detection of reflectors and their properties from standard borehole acoustic array data without the need of creating a two-dimensional ('2D') reflection image and a subsequent manual or automatic (e.g. pattern recognition algorithm) identification of reflectors. The information from the acoustic sensors may be automatically processed using at least one downhole processor, such as, for example, one or more processors on the tool. Method embodiments of the present disclosure are especially suitable for LWD applications, since the reflector information (representing the automatically detected reflectors and their properties) which is generated thereby is inherently small in size, and can be transmitted in real-time to the surface using conventional mud pulse telemetry.

Method aspects include approaches that do not require any a-priori information about the reflectors. For real-time control and utilization of acoustic data, techniques described herein enable processing of the acoustic data in order to provide reflector information faster than the rate of penetration ('ROP') of the tool.

Aspects of the present disclosure include methods of formation evaluation, such as performing well logging in a borehole intersecting an earth formation. Distributed tools, as well as permanently placed or temporarily installed distributed sensor systems are also included in the scope of the present disclosure.

General method embodiments may include automatically characterizing an acoustic reflective boundary in the earth formation by: generating a plurality of multipole acoustic signals within the borehole; generating acoustic wave data at at least one acoustic receiver on the logging tool in response to a plurality of acoustic reflections of acoustic waves from a corresponding plurality of reflection points along the boundary responsive to the multipole acoustic signals; estimating from the acoustic wave data a location in the formation for each reflection point of the plurality of reflection points; and using the location in the formation for each reflection point to estimate at least one property of the acoustic reflective boundary. Each acoustic reflection may be unique to a particular transmitter location and receiver location and a particular acoustic reflective boundary in the formation.

Aspects of the present disclosure may automatically provide a spatial location of detected reflection points, an intersection angle between the borehole and the detected reflector, a distance to the reflector-borehole intersection point, and/or other parameters. A reflection point is located at the reflector's interface (e.g. fracture, fault, bedding plane). In some embodiments, the combination of reflection points detected at multiple measurement points (e.g., multiple borehole depths) enables estimation of the spatial extension and continuity of identified reflectors. In other embodiments, a local dip of the boundary may be estimated about a particular reflection point using a location of a transmitter associated with the reflection point, a location of the receiver of the at least one acoustic receiver associated with the reflection point, and the location within the formation of the reflection point. Upon estimating an intersection angle between the borehole and the detected reflector, given the borehole deviation (e.g., as estimated from measurements by other sensors), the geological dip of the reflector may be calculated as well.

In LWD/MWD contexts, estimation of the distance from the source or other fixed point located on the acoustic tool or BHA to the reflector-borehole intersection point provides the capability to look ahead of the drill bit. Depending on the dip of the reflection interface, the look-ahead capability may exceed a hundred feet or more. In some apparatus embodiments, the reflector's dip and the intersection distance as well as the source and receiver coordinates may be provided, allowing the spatial reflector's position relative to the borehole to be displayed.

Aspects of the present disclosure relate to using at least one acoustic sensor as part of one or more downhole acoustic well logging tools or distributed sensor systems to produce acoustic information responsive to an acoustic wave from the earth formation. The sensor may include at least one acoustic transmitter and at least one acoustic receiver disposed on a carrier in the borehole. A receiver and transmitter may be implemented as the same transducer, different transducers, or one or more transducer arrays. The information is indicative of a parameter of interest. The term "information" as used herein includes any form of information (analog, digital, EM, printed, etc.), and may include one or more of: raw data, processed data, and signals.

Techniques of the present disclosure may be iteratively applied at a plurality of borehole depths, on a continuously updated basis. As one example, one or more transmitters or receivers may be positioned on the tool which is conveyed in the borehole. A series of pulses may be transmitted from various positions on the tool as the tool moves within the borehole. Direct and reflection wave separation and reflection data enhancement in accordance with conventional processing may be performed, and conventional estimation of formation slowness may be obtained, as described in further detail below.

Methods may include estimating a parameter of interest from the information, evaluating the formation using the parameter of interest, and/or performing further borehole or formation operations in dependence upon the location of the reflection points, the location of the boundary, the parameter of interest of the boundary, or other parameters of interest derived from these. In particular embodiments, a state of drilling operations, characteristics of the borehole or formation, or orientation of components of the downhole tool may be estimated using the parameter of interest, and then used in performing an operation as described above.

Aspects of the present disclosure are subject to application in various different embodiments. The carrier may be a drill string, coiled tubing, a slickline, an e-line, a wireline, etc. A downhole tool may be coupled or combined with additional tools, including, e.g., some or all the information processing system, as shown in FIG. 1B, discussed in further detail below. In some general embodiments, a carrier is implemented as a tool string of a drilling system, and the acoustic wellbore logging may be characterized as "logging-while-drilling" (LWD) or "measurement-while-drilling" (MWD) operations. As described herein, "borehole" or "wellbore" refers to a single hole that makes up all or part of a drilled well. Depending on the configuration, systems shown herein may be used during drilling and/or after the wellbore has been formed, including, in some instances, after the installation of casing or production infrastructure. While a land system is shown, the teachings of the present disclosure may also be utilized in offshore or subsea applications. As described herein, "formations" refer to the various features and materials that may be encountered in a subsurface environment and surround the borehole.

FIGS. 1A and 1B illustrate components of systems in accordance with embodiments of the present disclosure. FIG. 1A is a schematic diagram of an example drilling system 101 according to one embodiment of the disclosure. The drilling system 101 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor S1 in line 138 provides information about the fluid flow rate. A surface torque sensor S2 and a sensor S3 associated with the drill string 120 respectively provide information about the torque and the rotational speed of the drill string 120. Tubing injection speed is determined from the sensor S5, while the sensor S6 provides the hook load of the drill string 120.

Well control system 147 is placed at the top end of the borehole 126. The well control system 147 includes a surface blow-out-preventer (BOP) stack 115 and a surface choke 149 in communication with a wellbore annulus 127. The surface choke 149 can control the flow of fluid out of the borehole 126 to provide a back pressure as needed to control the well.

In some applications, the drill bit 150 is rotated by only rotating the drill pipe 122. However, in many other applications, a downhole motor 155 (mud motor) disposed in the BHA 190 also rotates the drill bit 150. The rate of penetration (ROP) for a given BHA largely depends on the WOB or the thrust force on the drill bit 150 and its rotational speed.

A surface control unit or controller 140 receives signals from the downhole sensors and devices via a sensor 143 placed in the fluid line 138 and signals from sensors S1-S6 and other sensors used in the system 101 and processes such signals according to programmed instructions provided to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form.

The BHA 190 may also contain formation evaluation sensors or devices (also referred to as MWD or LWD sensors) such as the acoustic sensors described above, as well as sensors for determining resistivity, density, porosity, permeability, other acoustic properties, nuclear-magnetic resonance properties, formation pressures, properties or characteristics of the fluids downhole and other desired properties of the formation 195 surrounding the BHA 190. Such sensors are generally known in the art and for convenience are generally denoted herein by numeral 165, and include counterparts to the sensor(s) 5 described above with respect to FIG. 1A. The BHA 190 may further include a variety of other sensors and devices 159 for determining one or more properties of the BHA 190 (such as vibration, bending moment, acceleration, oscillations, whirl, stick-slip, etc.), drilling operating parameters (such as weight-on-bit, fluid flow rate, pressure, temperature, rate of penetration, azimuth, tool face, drill bit rotation, etc.). For convenience, all such sensors are denoted by numeral 159.

The BHA 190 may include a steering apparatus or tool 158 for steering the drill bit 150 along a desired drilling path. In one aspect, the steering apparatus may include a steering unit 160, having a number of force application members 161a-161n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 158 having a bent sub and a first steering device 158a to orient the bent sub in the wellbore and the second steering device 158b to maintain the bent sub along a selected drilling direction. The steering unit 158, 160 may include near-bit inclinometers and magnetometers.

The drilling system 101 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 190 to provide the required force on the drill bit.

Example sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 101 can include one or more downhole processors at a suitable location such as 193 on the BHA 190. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art.

In embodiments, the MWD system utilizes mud pulse telemetry to communicate data from a downhole location to the surface while drilling operations take place. Various mud-pulse telemetry systems may be implemented. U.S. Pat. No. 3,764,968 describes a rotating valve for the purpose to transmit frequency shift key (FSK) or phase shift key (PSK) coded signals. U.S. Pat. No. 6,898,150 to Hahn et al, commonly owned and incorporated by reference herein in its entirety, discloses a hydraulically balanced reciprocating pulser valve. U.S. Pat. No. 7,417,920 to Hahn et al, commonly owned and incorporated by reference herein in its entirety, discloses an improved reciprocating pulser valve. Different types of valve systems are used to generate downhole pressure pulses. Valves that open and close a bypass from the inside of the drill string to the wellbore annulus create negative pressure pulses, for example see U.S. Pat. No. 4,953,595. Valves that use a controlled restriction placed in the circulating mud stream are commonly referred to as positive pulse systems, for example, see U.S. Pat. No. 3,958,217. Another example of a negative pulsing valve is illustrated in U.S. Pat. No. 4,351,037. This technology includes a downhole valve for venting a portion of the circulating fluid from the interior of the drill string to the annular space between the pipe string and the borehole wall. Drilling fluids are circulated down the inside of the drill string, out through the drill bit and up the annular space to surface.

While a drill string 120 is shown as a conveyance device for sensors 165, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 101 may include a bottomhole assembly and/or sensors and equipment for implementation of embodiments of the present disclosure on either a drill string or a wireline.

A point of novelty of the system illustrated in FIG. 1A is that the surface processor 142 and/or the downhole processor 193 are configured to perform certain methods (discussed below) that are not in the prior art. Surface processor 142 or downhole processor 193 may be configured to control mud pump 134, drawworks 130, rotary table 114, downhole motor 155, other components of the BHA 190, or other components of the drilling system 101. Surface processor 142 or downhole processor 193 may be configured to control sensors described above and to estimate a parameter of interest according to methods described herein.

Control of these components may be carried out using one or more models using methods described below. For example, surface processor 142 or downhole processor 193 may be configured to modify drilling operations i) autonomously upon triggering conditions, ii) in response to operator commands, or iii) combinations of these. Such modifications may include geosteering, changing drilling paramaters, mud parameters, and so on. Control of these devices, and of the various processes of the drilling system generally, may be carried out in a completely automated fashion or through interaction with personnel via notifications, graphical representations, user interfaces and the like. Additionally or alternatively, surface processor or downhole processor may be configured for the creation of the model. Reference information accessible to the processor may also be used.

In some general embodiments, surface processor 142, downhole processor 193, or other processors (e.g. remote processors) may be configured to use at least one sensor to produce a corresponding signal, responsive in part to a reflection of an emitted wave, from each of a plurality of azimuthally distributed orientations about a BHA. In some general embodiments, surface processor 142, downhole processor 193, or other processors (e.g. remote processors) may be configured to operate the tool 101 to excite and measure acoustic signals.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control. In embodiments, electronics associated with sensors 107 may be configured to record and/or process the information obtained (see FIG. 2).

FIG. 1B shows a hardware environment in accordance with embodiments of the present disclosure. Certain embodiments of the present disclosure may be implemented with a hardware environment 21 that includes an information processor 17, an information storage medium 13, an input device 11, processor memory 9, and may include peripheral information storage medium 19. The hardware environment may be in the well, at the rig, or at a remote location. Moreover, the several components of the hardware environment may be distributed among those locations. The input device 11 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

Systems as described above may be used to automatically characterize an acoustically reflective boundary in the earth formation by estimating at least one property of the acoustic reflective boundary, including an estimate of the location of the boundary with respect to the tool, within the formation, or according to other global coordinate systems. Estimating the location of the boundary as described above may include estimating the boundary's position and orientation (e.g., dip). In particular embodiments, a logging system is configured for imaging away from the borehole, with P and S body waves radiated into the formation directly around the transmitter.

Figure 2:
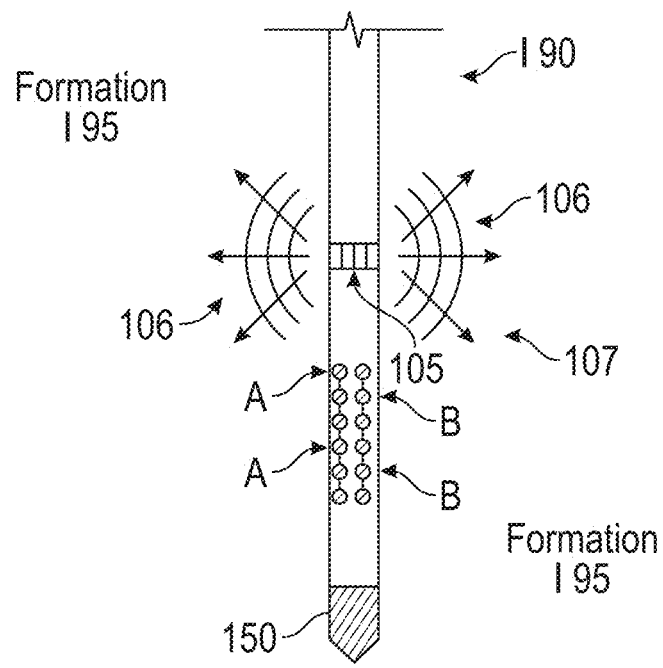
FIG. 2 is a schematic view of an acoustic LWD tool system on a BHA drill collar containing a drill bit.

FIG. 2 is a schematic view of an acoustic LWD tool system on a BHA drill collar 190 containing a drill bit 150. This system is mounted on the BHA drill collar 190 for performing acoustic measurements while the formation is being drilled. The acoustic logging while drilling tool system has a source 105 to emit acoustic vibrations 106 that may traverse formation 195 and may also be propagated along the borehole wall and be received by sensors A and B which may be in arrays. Collectively, transmitters, receivers, and associated circuitry comprises sensor(s) 107. Suitable filtering techniques, including phased arrays, may be employed to reduce the drillbit noise. In an alternate embodiment of the disclosure, the transmitter 105 may be located between the sensors and the drillbit 150.

Figure 3:
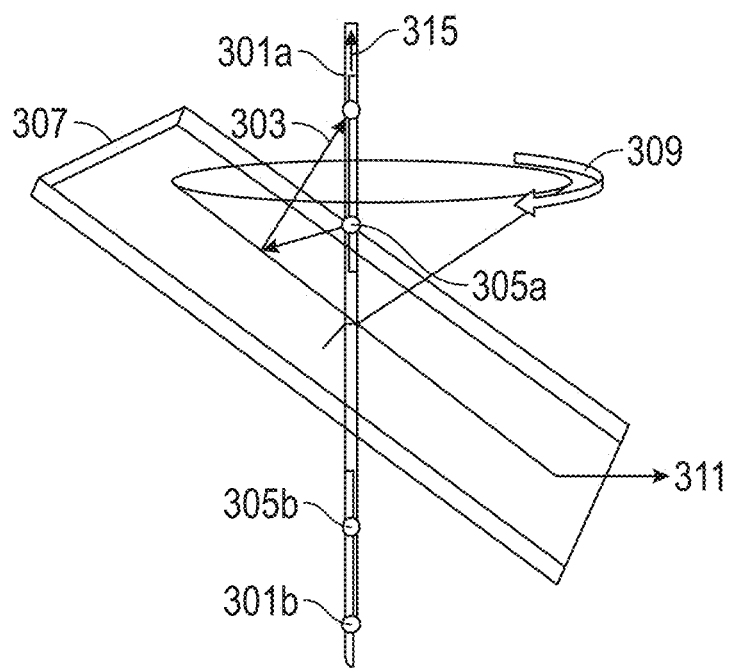
FIG. 3 illustrates how borehole acoustic measurement can obtain the geological structural information away from the borehole.

FIG. 3 illustrates how borehole acoustic measurement can obtain the geological structural information away from the borehole. Depicted is a logging tool having one or more sources 301a, 301b crossing a dipping bed 307 intersecting the borehole 315. As an acoustic source on the tool is energized, it generates acoustic waves that can be classified into two categories according their propagation direction. The first is the waves that travel directly along the borehole. These direct waves are received by an array of receivers (not shown) on the tool and subsequently used to obtain acoustic parameters, such as velocity, attenuation, and anisotropy, etc., for the formation adjacent to the borehole. The waves of the second category are the acoustic energy that radiates away from the borehole and reflects back to the borehole from boundaries of geological structures. These waves are called secondary arrivals in acoustic logging data because their amplitudes are generally small compared to those of the direct waves. As shown in this figure, depending on whether the tool is below or above the bed, acoustic energy strikes the lower or upper side of the bed and reflects back to the receiver as the secondary arrivals. An exemplary raypath 303 for such a reflected wave is shown.

Azimuthal ambiguity may be resolved using directional acoustic measurements in a borehole. These directional measurements can be made with an acoustic tool that has a dipole source and/or receiver system. U.S. Pat. No. 4,649,525 to Angona et al discloses the use of a dipole acoustic logging for determination of formation shear velocities. A very useful property of a dipole source or receiver system is its directionality. That is, the generated or the received wave amplitude A depends on the angle θ between the wave's associated particle motion direction (polarization) and the source or receiver orientation, and may be denoted by $$A \propto cos\ \theta \qquad (1).$$

With this directionality, one can use oriented source and/or receiver(s) to generate and record acoustic wave energy. An acoustic measurement made in this way is called the directional measurement. In fact, the directionality property of the dipole source/receiver has been utilized to determine formation azimuthal shear-wave anisotropy. In the present invention, the directionality of the wave amplitudes, as measured by a directional acoustic system, is used to determine the azimuth of a near-borehole structure.

Such directional measurements using dipole transmitters and/or receivers have been disclosed in U.S. Pat. No. 6,176,344 to Lester having the same assignee as the present invention and the contents of which are fully incorporated herein by reference.

U.S. Pat. No. 7,035,165 to Tang having the same assignee as the present disclosure and the contents of which are incorporated herein by reference discloses a method in which a plurality of multicomponent acoustic measurements are obtained at a plurality of depths and for a plurality of source-receiver spacings on the logging tool. An orientation sensor on the logging tool, such as a magnetometer, may be used for obtaining an orientation measurement indicative of an orientation of the logging tool. The multicomponent measurements are rotated to a fixed coordinate system (such as an earth based system defined with respect to magnetic or geographic north) using the orientation measurement, giving rotated multicomponent measurements. The rotated multicomponent measurements are processed for providing an image of the subsurface. While the problem of Stoneley waves is not specifically discussed in Tang, examples shown by Tang and good signal-to-noise ratio for imaging of interfaces, e.g., bed boundaries.

U.S. Pat. No. 8,055,448 B2 to Mathiszik et al., having the same assignee as the present disclosure and the contents of which are incorporated herein by reference, discloses further improvements in MWD acoustic imaging. A downhole acoustic logging tool is used for generating a guided borehole wave that propagates into the formation as a body wave, reflects from an interface and is converted back into a guided borehole wave. Guided borehole waves resulting from reflection of the body wave are used to image a reflector. U.S. Pat. No. 8,811,114 B2 to Geerits et al., having the same assignee as the present disclosure and the contents of which are incorporated herein by reference, discloses further improvements in MWD acoustic imaging.

Having multiple sources axially distributed in the drillstring enables the performance of a multi-offset measurement (variable source-receiver and source-reflector distance) in one run. With only one source in the drillstring this could be achieved by repetitive measurements while drilling ahead only. Mapping the same reflector with changing source-reflector distances as well as having varying source-receiver offsets is beneficial for proper data evaluation.

The acoustic reflection image may be a result of acoustic pre-processing (e.g., noise reduction, filtering, removal or attenuation of direct waves and multiples). One major difference of the borehole acoustic data, as compared to surface seismic data, is the large amplitude direct arrivals in the borehole data. These direct waves must be removed before processing the secondary arrivals of much smaller amplitude.

One processing sequence used for processing the data is described in Li et al. for processing monopole data, but which may be applied for multipole data as well. A bandpass filtering (high cut) technique may be used to first remove the low-frequency events, such as the low-frequency Stoneley waves generated by a monopole source, or the low-frequency flexural-shear waves generated by a dipole source. A median filter may be applied to remove the direct waves. Afterwards, wave-separation techniques may be applied to separate the secondary arrivals from the direct arrivals based on their moveout characteristics. For example, in the single-receiver data gathered for various depths (or tool positions), the direct arrivals have a small moveout because their propagation distance (source-to-receiver spacing) is fixed. In comparison, the reflection events have a large moveout because their propagation distance changes as the tool moves close to or away from the reflector. A number of techniques may be used for the wave separation, e.g., f-k methods such as that taught by Hornby, or a combination of f-k and median filtering by Li et al, etc. The separated waves, according to their moveout, are sorted into reflected up-going and reflected down-going subsets. Optionally, a dip median filter may be applied to enhance the downgoing and upcoming reflections.

The data may be windowed to exclude converted waves and multiples. In conventional imaging techniques, following this, the secondary arrivals (reflection events) from the wave-separation procedure are then respectively migrated to image the upper and lower side of the formation reflector using one or more well-known migration techniques, e.g., the back-projection scheme using a generalized Radon transform as discussed by Hornby, or the commonly used Kirchoff depth migration method as discussed, for example by Li et al. After conventional migration, the acoustic component data would be mapped into a two-dimensional ('2D') domain.

In techniques of the present disclosure, however, acoustic migration is unnecessary and may be omitted. By avoiding migration, great gains in efficiency may be achieved. Acoustic migration, as used herein, refers to a geometric relocation of acoustic events, represented by coherent signals along curves within the image.

Figure 4:
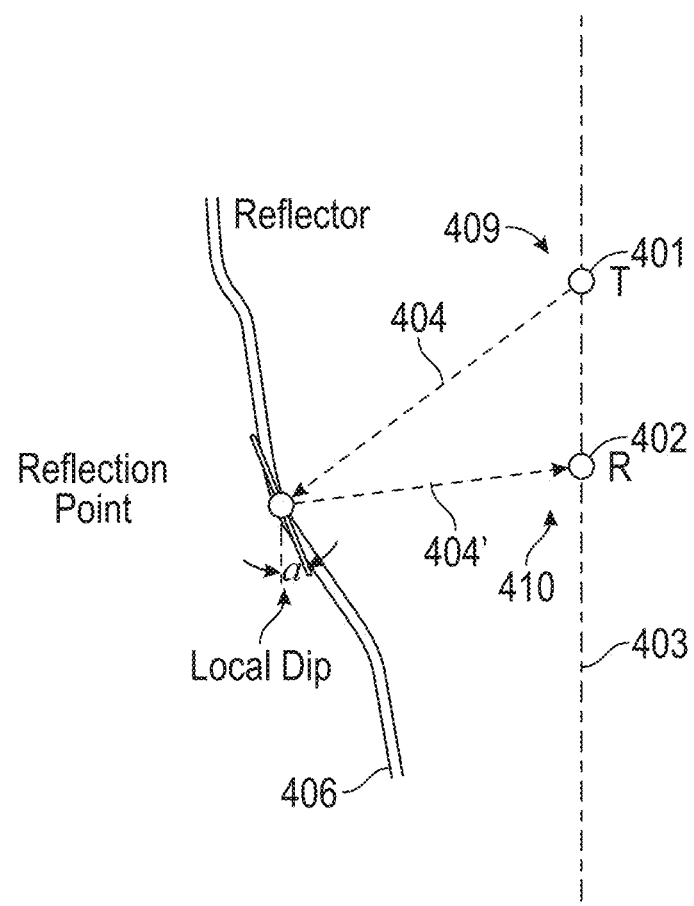
FIG. 4 illustrates techniques for acoustic formation evaluation in accordance with embodiments of the present disclosure.

FIG. 4 illustrates techniques for acoustic formation evaluation in accordance with embodiments of the present disclosure. FIG. 4 shows an acoustic transmitter 401 and an acoustic receiver 402 relative to a borehole 403. Detected acoustic waves 404' used in the techniques disclosed herein may be characterized as being a reflection of a wave 404 from a particular transmitter 401 which is reflected from a particular reflection point 405 on the acoustically reflective boundary ('reflector') 406. Aspects of the disclosure are related to specular acoustic reflection. Thus, each acoustic reflection is unique to a particular transmitter location 409 and receiver location 410 and a particular acoustic reflective boundary 406 in the formation. These reflection points may be identified and used to characterize the reflector.

Figure 5A:
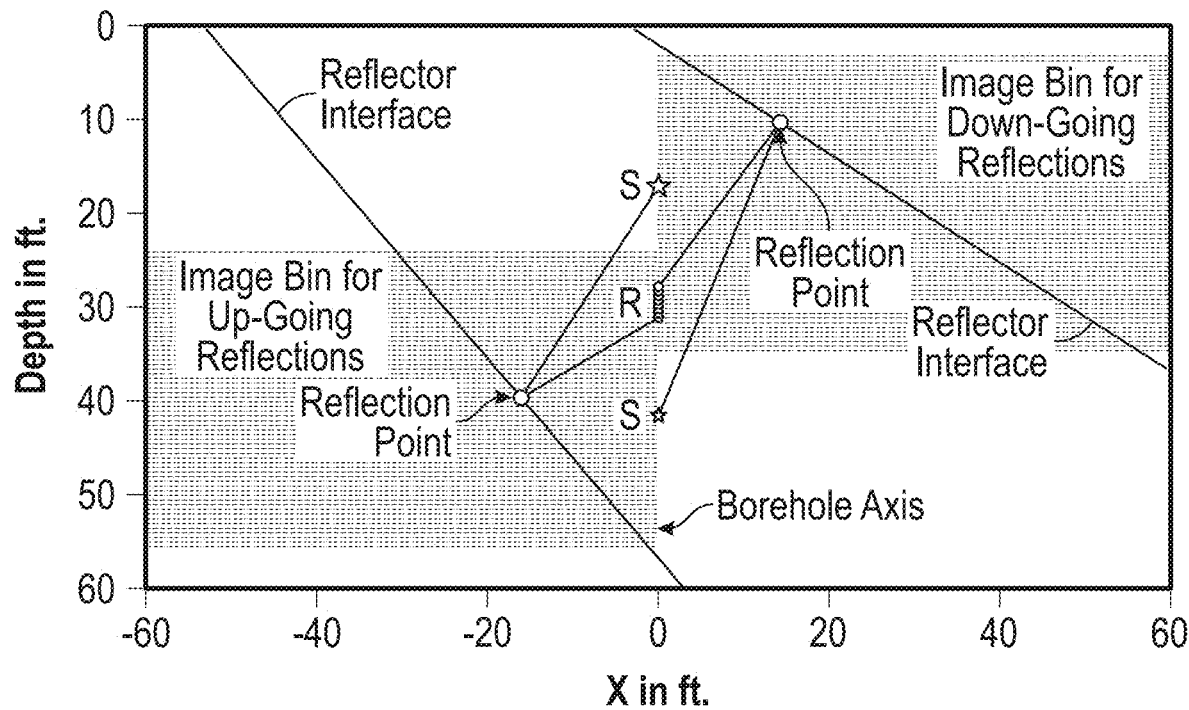
FIGS. 5A & 5B illustrate estimating from the acoustic wave data a location in the formation for each reflection point of the plurality of reflection points in accordance with embodiments of the present disclosure.
Figure 5B:
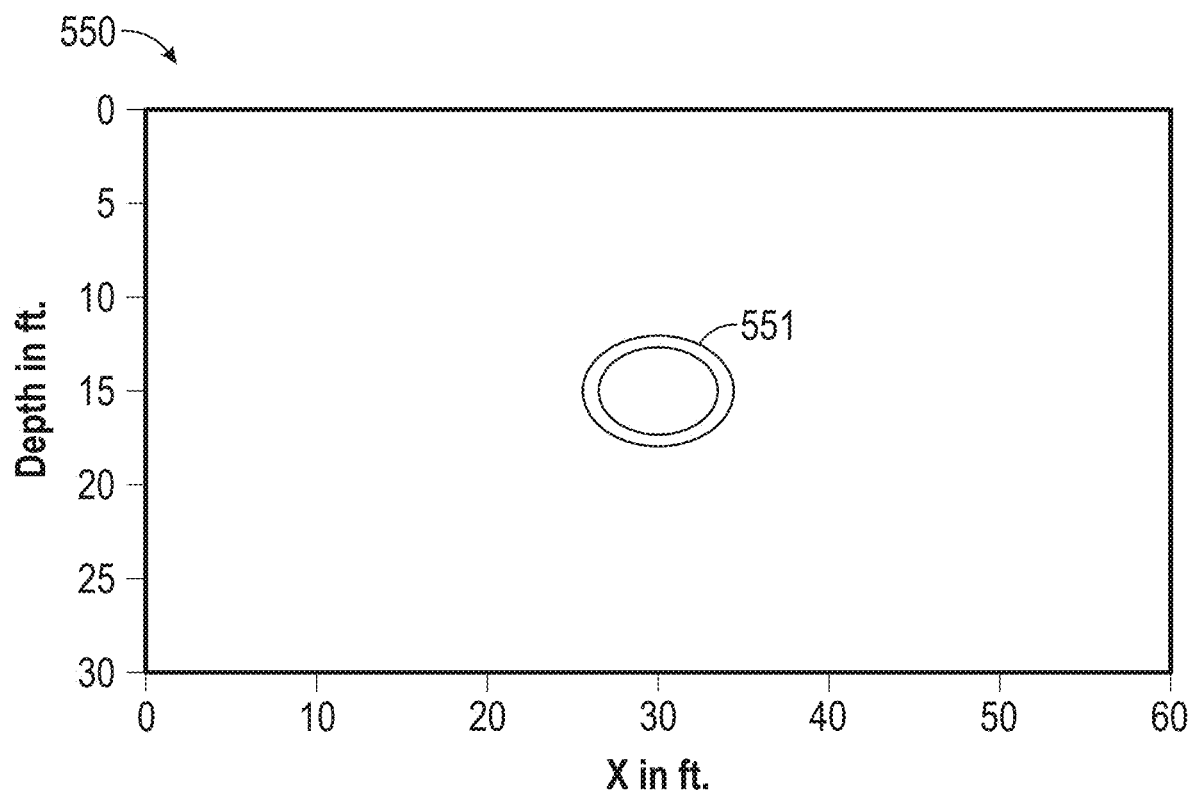

FIGS. 5A and 5B illustrate estimating from the acoustic wave data a location in the formation for each reflection point of the plurality of reflection points in accordance with embodiments of the present disclosure. Detection of the reflection points may be conducted by generating a coherence map from the acoustic reflection information. Referring to FIG. 5A, two image bins (grids), which move along with the tool, are assigned to the up- and down-going reflections, respectively. The axial and radial size of the image area is adjusted by the user such that it best covers the formation area illuminated by acoustic waves. Knowing the source and receiver coordinates, the unique spatial location of the reflection point in the "global" coordinate system can be determined: i.e. measured depth vs radial distance from borehole. The present invention may use values of the velocity v obtained from the direct signal between a source and a plurality of receivers in the tool. A feature in the acoustic wave data (e.g., a peak in the semblance) has a near-receiver time and a slowness associated with it. The slowness is calculated as the difference in time of arrival between two receivers divided by the distance between the receivers. So using the distance from the transmitter to the receiver and the slowness, it is possible to determine the distance d from the transmitter to the reflection point as well as the direction. In this way, the grid may indicate acoustic events at a particular depth and radial distance.

At each grid point in the image area, a coherence measure (e.g., semblance coefficient) may be evaluated within a time window over neighboring traces. Values may lie in a range between 0 (e.g., no coherence) and 1 (e.g., high coherence), inclusive. If the grid point coincides with the true reflection point, the constructive interference within a time window results in a high coherence (value of 1). On the other hand, if the grid point is not associated with any reflection point, the destructive interference leads to a low coherence.

The signals may be processed to generate a coherence mapping. That is, for each relevant depth level z in the borehole, a coherence measure may be determined. The acoustic wave data can be converted to a coherence measure based on a relationship between the coherent and total energies received by at the receivers in accordance with techniques well known in the art. A variety of coherence formulae may be employed, each recommended by corresponding advantages and disadvantages for particular applications.

As an example, a coherence value $C(r,x_0,s)$ at an arbitrary image point (an arbitrary grid point in the image area) $x_0$ can be obtained by evaluating a semblance coefficient (Neidell and Taner. Semblance And Other Coherency Measures For Multichannel Data, Geophysics 1971, vol. 36, p. 482) pertaining to a (to be defined) group of N transmitter-receiver combinations that illuminate the image point $x_0$ and to a time window $[\tau_0-T/2,\tau_0+T/2]$ $$C(r, x_0, s) = \frac{\int_{-T/2}^{T/2} \left| \sum_{k=0}^{N-1} u_{sc,k}(t' + t_{0,k}) \right|^2 dt'}{N \int_{-T/2}^{T/2} \sum_{k=0}^{N-1} |u_{sc,k}(t' + t_{0,k})|^2 dt'}$$

Where $u_{sc,k}$ is the acoustic wavefield measured at receiver $r_k$, $\tau_{0,k}$ is the traveltime calculated along the path from transmitter $s_k$ to the image point $x_0$ to receiver $r_k$. A typical choice for the window length is one cycle of the signal.

FIG. 5B is a contour plot illustrating a coherence map in accordance with embodiments of the present disclosure. The contour plot 550 is demonstrated for purposes of simplifying the illustration: other types of displays, such as color coding or gray-scale displays of the semblance may be used to make the subsequent interpretive steps easier.

Acoustic reflections may be identified on the coherence map according to increased levels of energy. In general embodiments, the acoustic reflection may be identified by identifying local maxima in the coherence map, wherein the local maxima are representative of the specular acoustic reflections. False detections can be identified as the measurement proceeds and coherence maps evaluated at subsequent depths do not confirm the existence of the previously detected reflection event. Local maximum 551 (coherence peak) is indicative of the presence of the reflection point. The position of the reflection point may thus be determined from the grid.

Coherence maps may contain a plurality of local maxima, where each local maximum represents one reflection point. In particular embodiments, the robust and automatic detection of these local maxima is an essential step in the automatic reflector detection workflow. In general, there is a variety of algorithms that can be used to detect peaks in the input image.

Figure 5C:
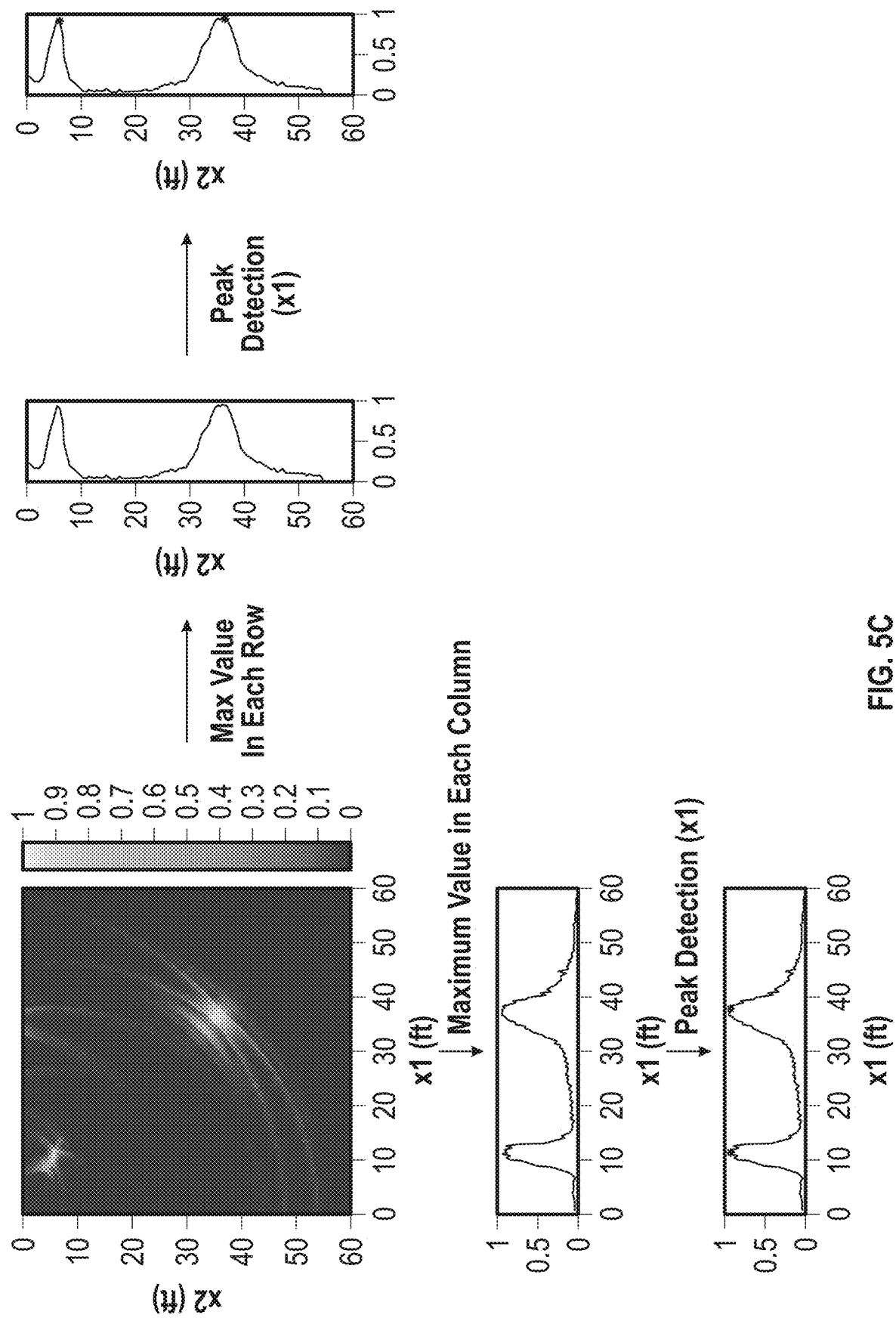
FIG. 5C illustrates techniques for finding local maxima coordinates in accordance with embodiments of the present disclosure.

FIG. 5C illustrates techniques for finding local maxima coordinates in accordance with embodiments of the present disclosure. The original problem of detecting local maxima in a 2D array is simplified by detecting peaks in two 1D arrays. Array 1 is obtained by taking a maximum value along each row of the coherency map; while array 2 is obtained by taking a maximum value along each column of the coherency map.

In the next step, the peak (local maximum) detection is performed in both 1D arrays. A point is considered a peak if it has a maximum value between two adjacent local minima. The difference between the maximum value, $f((x_{MAX,i})$, and the values between two neighboring local minima, $f(x_{MIN,i-1})$ and $f(x_{MIN,i+1})$, is greater than the global threshold value $\delta$, such that $$f(x_{MAX,i})-f(x_{MIN,i-1}) \geq \delta, \text{ and}$$

$$f(x_{MAX,i})-f(x_{MIN,i+1}) \geq \delta$$

where i is the local maximum index. The global threshold value lies in the range (0,1) and is a user-defined parameter.

Finally, the exact spatial coordinates of the i-th reflection point $x_i=(x_{i,1},x_{i,2})$ can be obtained. The coordinate of the i-th peak detected in Array 1 provides the $x_{i,1}$ coordinate of the i-th reflection point $x_i$. The coordinate of the i-th peak detected in Array 2 provide the $x_{i,2}$ coordinate of the i-th reflection point $x_i$.

The $x_1$ coordinate corresponds to the radial distance away from the borehole and the $x_2$ coordinate corresponds to the MD (Measured Depth) distance, i.e., the distance to the current transmitter location.

Upon determining the location of the reflection point, it is possible to determine further properties of the boundary. In accordance with the law of reflection: the incident ray, the reflected ray and the normal to the reflection surface at the reflection point lie in the same plane; and the angle of incidence is equal to the angle of reflection. It is evident that for a fixed source-receiver pair, a unique point of incidence (the so-called specular reflection point) at the reflection surface can be determined. Conversely, with the location of the specular reflection point known for a given source-receiver pair, it is possible to find the parameters of the associated reflection surface.

Figure 6A:
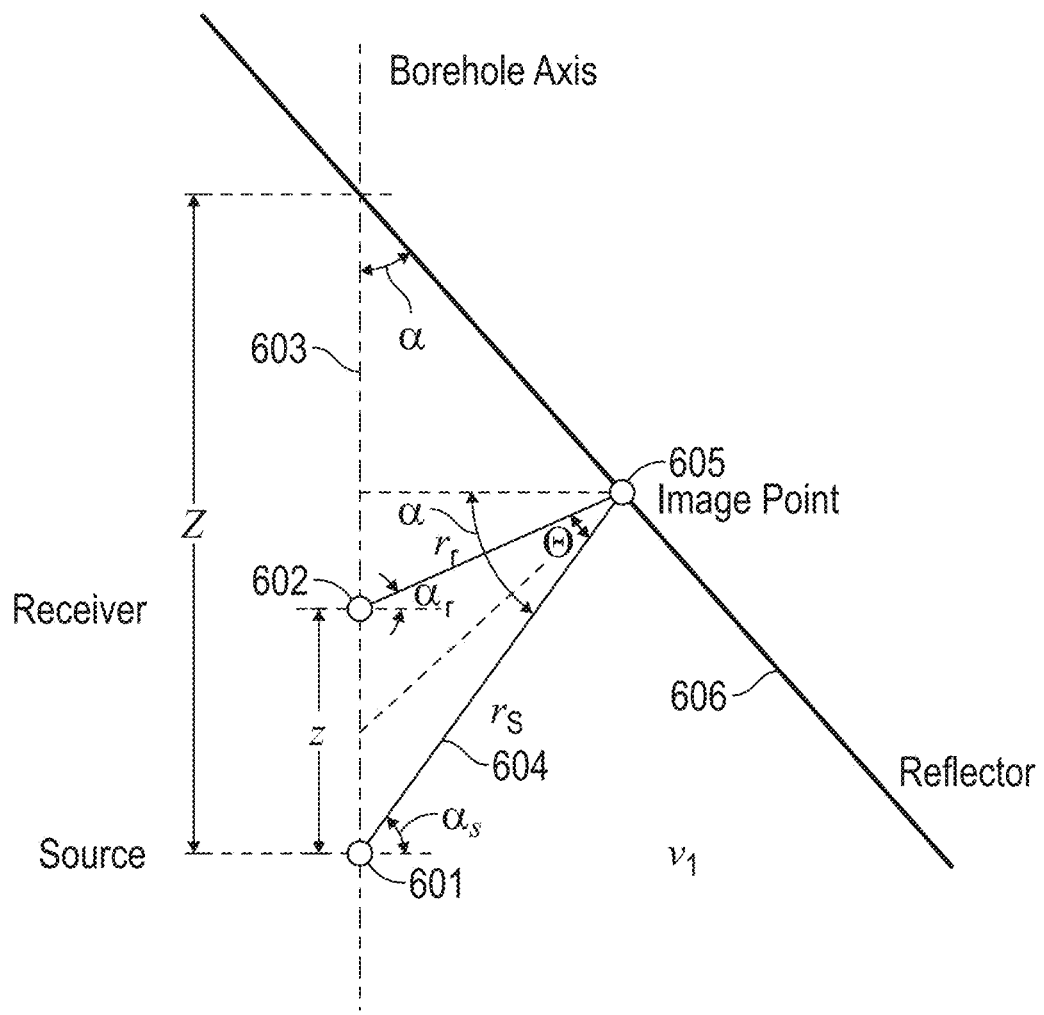
FIG. 6A illustrates techniques in accordance with embodiments of the present disclosure.

FIG. 6A illustrates techniques in accordance with embodiments of the present disclosure. An acoustic transmitter 601 and an acoustic receiver 602 are conveyed in a borehole 603. A wave 604 is reflected from a particular reflection point 605 on the acoustically reflective boundary ('reflector') 606.

Each image point in the image bin is considered as a potential reflection point associated with a particular reflection surface. In order to find properties of a reflector associated with the triplet: source 601, image point 605, and receiver 602 additional attributes may be determined. These geometric attributes are independent of the tool's position and formation slowness, so they can be pre-calculated for the image bin prior to measurement.

The following geometric attributes may be calculated:
$r_s$ is distance along the incident ray path (from a source to an image point);
$r_r$ is distance along the reflected ray path (from an image point to a receiver);
$\alpha_s$ angle between the incident ray and the normal to the borehole axis;
$\alpha_r$ angle between the reflected ray and the normal to the borehole axis;
$\theta$ obliquity angle, which is the angle between the incident and reflected ray.

Figure 6B:
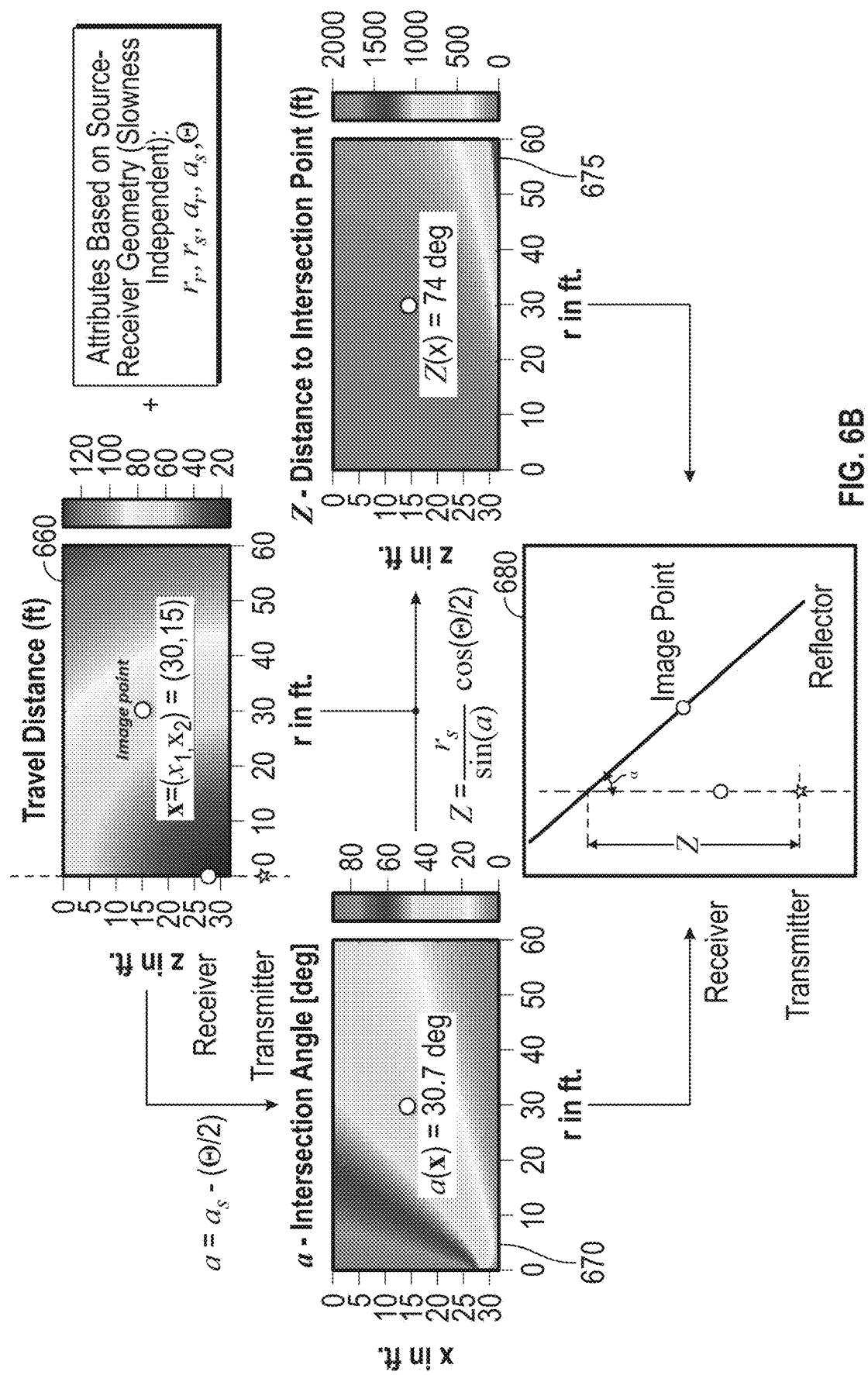
FIG. 6B is a dataflow diagram illustrating processes for determining properties of the system.

FIG. 6B is a dataflow diagram illustrating processes for determining properties of the system. Using the image point coordinates, at block 660, reflector parameters may be determined, including the intersection angle (block 670) between borehole and the detected reflector, the geological dip of the reflector, the distance from the source (or any other fixed point located on the acoustic tool or BHA) to the reflector-borehole intersection point (block 675), and the reflector's position relative to the borehole (block 680). Having the local coordinates of the detected reflection point as well as the source and receiver coordinates, the corresponding local reflector's dip and the intersection distance are automatically retrieved from pre-calculated attributes in a lookup table.

The intersection angle $\alpha$ may be calculated according to the relation:

$$\alpha=\alpha_s-(\theta/2).$$

If the borehole deviation is known, the geological dip of the reflector local to the reflection point can be derived from the intersection angle α.

Distance Z from the source to the reflector/borehole intersection point may be calculated using the following relation:

$$Z = \frac{r_s}{\sin(\alpha)} \cos(\Theta/2).$$

In LWD contexts, formation information representing the boundary may be transferred as data in real-time (e.g., reflection point(s) coordinates and the corresponding reflector(s) properties) to the surface and the results displayed to an operator (see, e.g., block 680). Knowing the reflector's dip and the intersection distance as well as the global source and receiver coordinates enables visualization of the position of a reflection interface relative to the borehole and the drill bit.

Figure 7A:
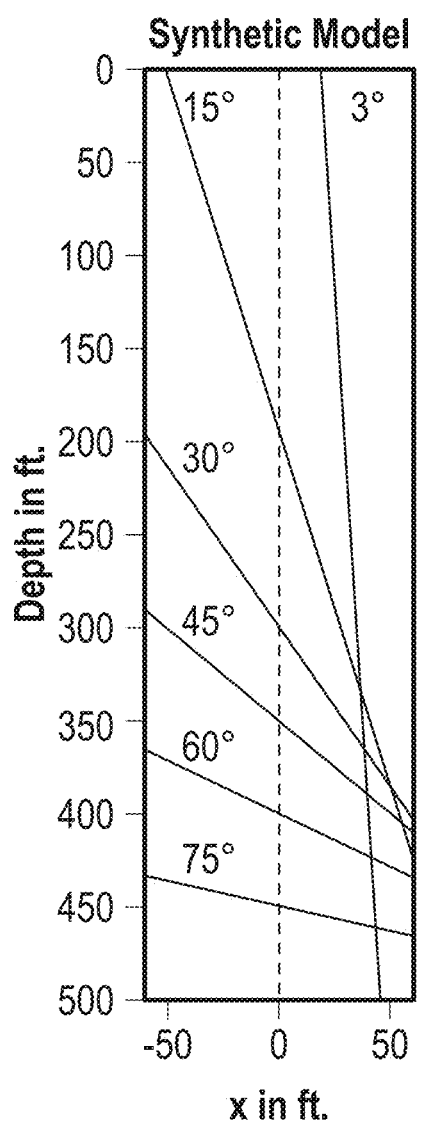
FIGS. 7A-7C show plots illustrating results of a simulation validating the effectiveness of techniques in accordance with embodiments of the present disclosure.
Figure 7B:
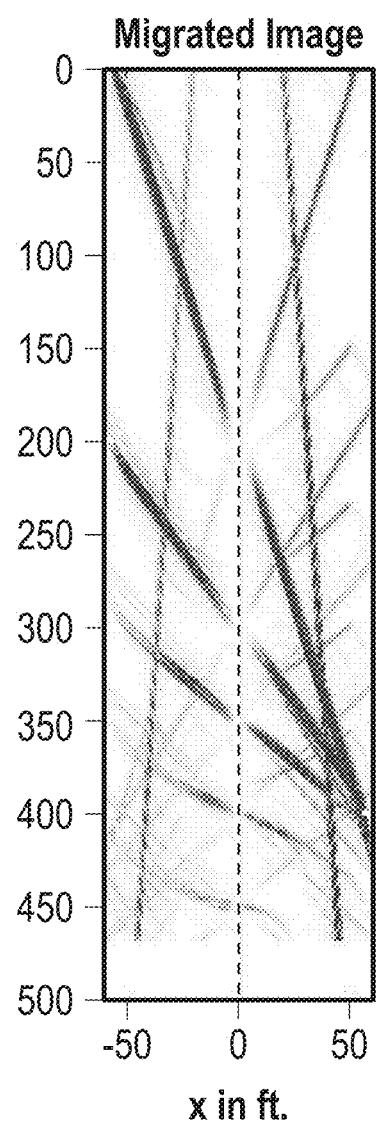
Figure 7C:
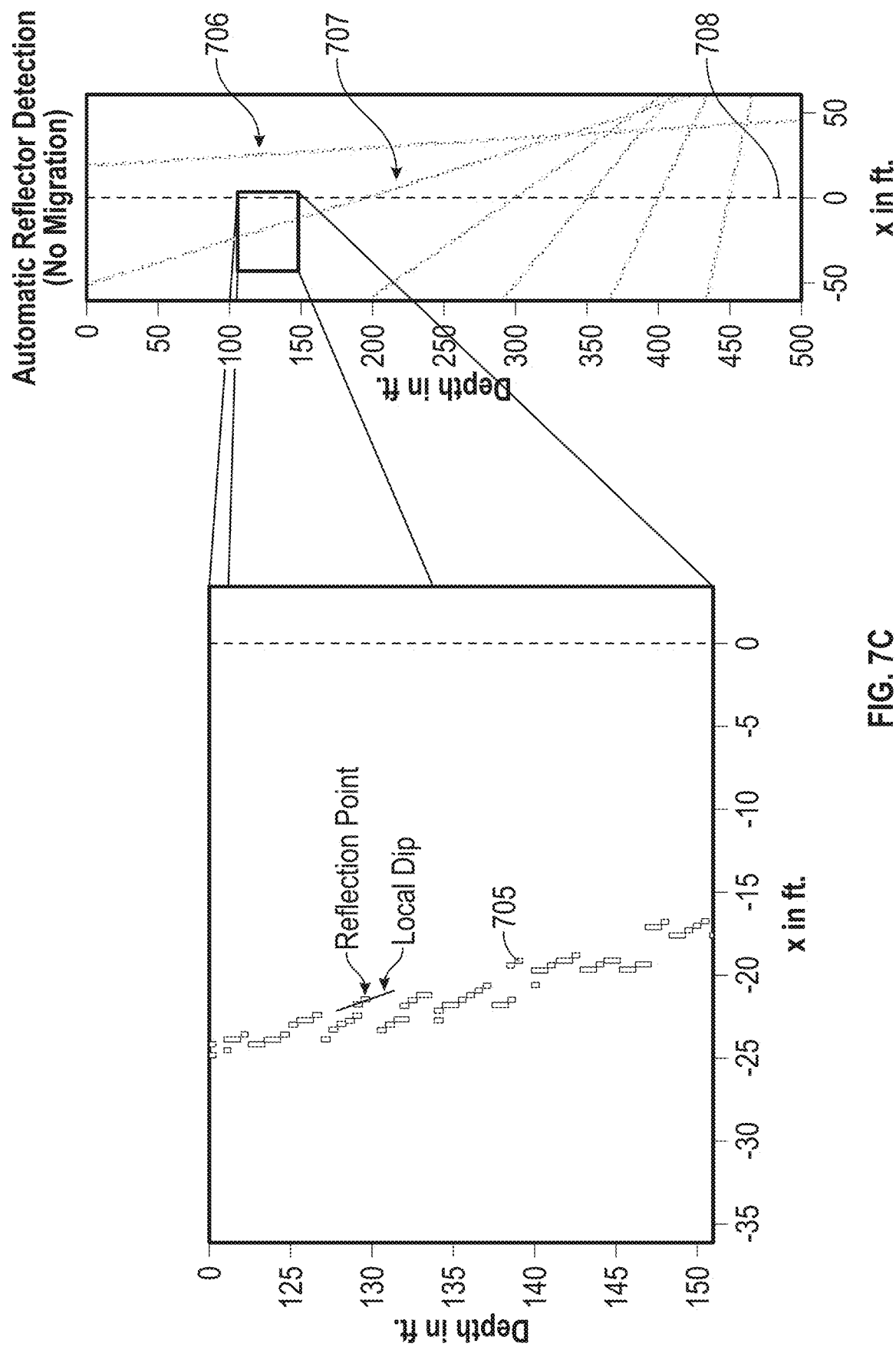

FIGS. 7A-7C show plots illustrating results of a simulation validating the effectiveness of techniques in accordance with embodiments of the present disclosure. FIG. 7A shows a synthetic reflector model containing multiple reflectors intersecting the borehole at various angles. A wireline tool configuration was simulated using a computer physics program to generate acoustic array data for this model.

FIG. 7B shows simulated results from the synthetic data processed with a conventional SWI program. FIG. 7C shows simulated results from the synthetic data processed in accordance with embodiments of the present disclosure. The acoustic data was processed as if it were recorded with an LWD tool (from top to bottom). FIG. 7C shows reflection points detected at all available measurement points. The position of detected reflection points is shown in the "global" coordinate system: measured depth vs radial distance from the borehole. Embodiments of the disclosure incorporate display of the data in a same manner, facilitating analysis of the spatial extension and continuity of detected events. The proposed algorithm identified all reflectors 705, including the high-angle reflectors 706 and 707, at 60 and 75 degrees, respectively. Due to the very limited acquisition aperture (e.g., distance from the source to the last receiver in an array) of the borehole acoustic tool, only waves reflected from high-angle reflectors were recorded in the close vicinity of the borehole 708.

FIGS. 8A-8D illustrate partial results using only three example measurement points. The reflection points identified as local maxima 801 in coherency maps are used to infer the properties 802 of corresponding reflectors, as described in greater detail above with respect to FIGS. 6A & 6B. Looking at FIG. 8D, the detected reflectors are then displayed in the common image 803 relative to the borehole 805. It is apparent that the agreement between the reflectors' values obtained at various measurement points (corresponding to graphic indicia of reflectors, such as, for example, curves 811, 812, 813 for the 30 degree reflector) is quite good. There is also good agreement with the actual reflector model (dotted lines) 804. The results show that the disclosed method successfully detected reflectors and their parameters from borehole acoustic array data in an automatic fashion.

Figure 9:
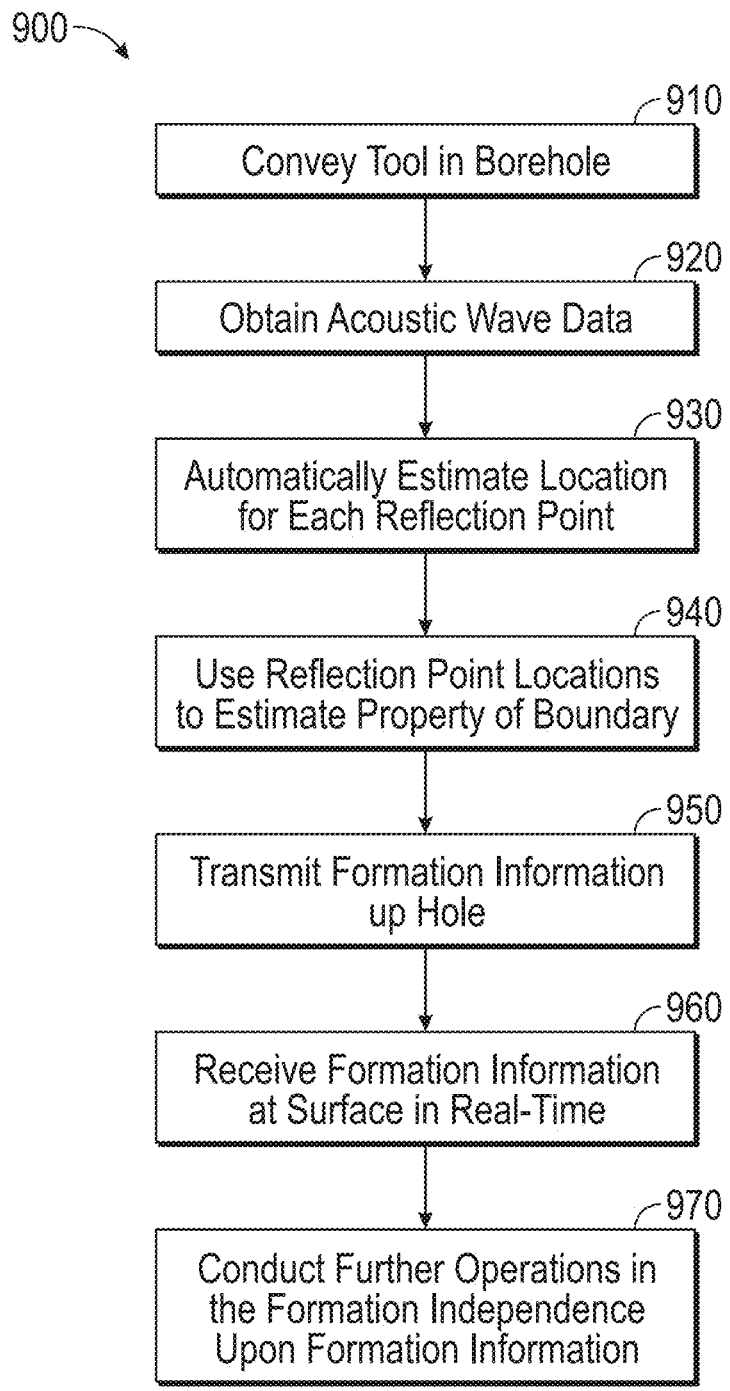
FIG. 9 shows a flow chart 900 illustrating methods for performing well logging in a borehole intersecting an earth formation in accordance with embodiments of the present disclosure.

FIG. 9 shows a flow chart 900 illustrating methods for performing well logging in a borehole intersecting an earth formation in accordance with embodiments of the present disclosure. In optional step 910, an acoustic well logging tool is conveyed in a borehole using a carrier. The borehole may be filled with downhole fluid.

Optional step 920 of the method 900 may include obtaining acoustic wave data with the acoustic well logging tool. Step 920 may include generating a plurality of multipole acoustic signals within the borehole and generating acoustic wave data at at least one acoustic receiver on the logging tool in response to a plurality of acoustic reflections of acoustic waves from a corresponding plurality of reflection points along the boundary responsive to the multipole acoustic signals.

Step 930 comprises automatically estimating from the acoustic wave data a location in the formation for each reflection point of the plurality of reflection points. This may be carried out by performing coherence processing on at least a portion of the acoustic wave data to generate a coherence map; and identifying specular acoustic reflections from the coherence map. Identifying the acoustic reflections may include identifying local maxima in the coherence map, wherein the local maxima are representative of the acoustic reflections. Step 940 includes using the location in the formation for each reflection point to estimate at least one property of the acoustic reflective boundary. This may include estimating a local dip of the boundary about a particular reflection point using a location of a transmitter associated with the reflection point, a location of the receiver of the at least one acoustic receiver associated with the reflection point, and the location within the formation of the reflection point. It may further include using the local dip to estimate a global dip of the reflective boundary and estimating at least one additional property, wherein the additional property comprises at least one of: i) an intersection angle between the borehole and the boundary; and ii) a distance of travel for the tool to meet the reflector-borehole intersection point.

Optional step 950 comprises transmitting formation information uphole. The formation information may represent at least one of: i) the location in the formation for each reflection point; and ii) the location of the acoustic reflective boundary; iii) an intersection angle between the borehole and the boundary; and iv) a distance of travel for the tool to meet a boundary-borehole intersection point. Optional step 960 comprises receiving the formation information at the surface in near real-time with respect to initiating the generation of the plurality of multipole acoustic signals. Optional step 970 comprises conducting further operations in the formation in dependence upon the formation information.

Optional methods may include using the parameter of interest to estimate a characteristic of a formation. Estimation of the parameter may include the use of a model. In some embodiments, the model may include, but is not limited to, one or more of: (i) a mathematical equation, (ii) an algorithm, (iii) an deconvolution technique, and so on. Reference information accessible to the processor may also be used.

Method embodiments may include conducting further operations in the earth formation in dependence upon formation information, estimated properties of the reflector(s), or upon models created using ones of these. Further operations may include at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation information.

Estimated parameters of interest may be stored (recorded) as information or visually depicted on a display. The parameters of interest may be transmitted before or after storage or display. For example, information may be transmitted to other downhole components or to the surface for storage, display, or further processing. Aspects of the present disclosure relate to modeling a volume of an earth formation using the estimated parameter of interest, such as, for example, by associating estimated parameter values with portions of the volume of interest to which they correspond, or by representing the boundary and the formation in a global coordinate system. The model of the earth formation generated and maintained in aspects of the disclosure may be implemented as a representation of the earth formation stored as information. The information (e.g., data) may also be transmitted, stored on a non-transitory machine-readable medium, and/or rendered (e.g., visually depicted) on a display.

The processing of the measurements by a processor may occur at the tool, the surface, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

Acoustic logs are records of the receipt, at successive borehole depth levels, of acoustic signals by receivers which are spaced along the length of a borehole tool from each other and from at least one transmitter of acoustic signals.

The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "processor" or "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on. Thus, a processor may be configured to perform one or more methods as described herein, and configuration of the processor may include operative connection with resident memory and peripherals for executing programmed instructions.

As used herein, the term "fluid" and "fluids" refers to one or more gasses, one or more liquids, and mixtures thereof. A "downhole fluid" as used herein includes any gas, liquid, flowable solid and other materials having a fluid property and relating to hydrocarbon recovery. A downhole fluid may be natural or man-made and may be transported downhole or may be recovered from a downhole location. Non-limiting examples of downhole fluids include drilling fluids, return fluids, formation fluids, production fluids containing one or more hydrocarbons, engineered fluids, oils and solvents used in conjunction with downhole tools, water, brine, and combinations thereof. An "engineered fluid" may be used herein to mean a human made fluid formulated for a particular purpose. The term "geosteering" may refer to changing direction of the drill bit, stopping progression of the drill bit, or continuing advancement of the drill bit.

It apparent that the values of slowness and velocity may be used interchangeably in the techniques disclosed herein. The parameters slowness and velocity are inversely related and the measurement of either may be converted to the other by simple mathematical relations that are well known in the art. Thus, the term "slowness" as used herein may refer to slowness as traditionally understood, as well as other parametric equivalents.

While the foregoing disclosure is directed to the one mode embodiments of the disclosure, various modifications will be apparent to those skilled in the art. It is intended that all variations be embraced by the foregoing disclosure.

What is claimed is:

1. A method for performing formation evaluation in a borehole intersecting an earth formation, the method comprising:
    conveying a drilling assembly into the borehole, the drilling assembly comprising:
        a logging tool including a transmitter and at least one acoustic receiver; and
        a mud pulse telemetry system;
    automatically characterizing an acoustic reflective boundary in the earth formation by:
        generating a plurality of multipole acoustic signals within the borehole by the transmitter;
        generating acoustic wave data at a plurality of borehole depths with the at least one acoustic receiver in response to a plurality of acoustic reflections of acoustic waves from a corresponding plurality of reflection points along the acoustic reflective boundary responsive to the multipole acoustic signals;
        estimating from the acoustic wave data a location in the earth formation for each reflection point of the plurality of reflection points with a processor;
        using the location in the earth formation for each reflection point to estimate at least one property of the acoustic reflective boundary; and
    sending, with the mud pulse telemetry system, the at least one property to a surface control unit.

2. The method of claim 1 wherein each acoustic reflection is unique to a particular transmitter location, a particular receiver location, and a particular acoustic reflective boundary in the earth formation.

3. The method of claim 1, wherein estimating the at least one property of the acoustic reflective boundary comprises estimating a local dip of the acoustic reflective boundary about a particular reflection point using a location of the transmitter associated with the particular reflection point, a location of a receiver of the at least one acoustic receiver associated with the particular reflection point, and the location within the earth formation of the particular reflection point.

4. The method of claim 3, wherein estimating the at least one property comprises using the local dip to estimate a global dip of the acoustic reflective boundary and estimating at least one additional property, wherein the additional property comprises at least one of: i) an intersection angle between the borehole and the acoustic reflective boundary; and ii) a distance of travel for the tool to meet a reflector-borehole intersection point.

5. The method of claim 1 wherein the at least one property comprises at least one of: i) the location in the earth formation for each reflection point; ii) the location of the acoustic reflective boundary; iii) an intersection angle between the borehole and the acoustic reflective boundary; and iv) a distance of travel for the tool to meet a boundary-borehole intersection point.

6. The method of claim 5 comprising receiving the at least one property at the surface control unit in near real-time with respect to generating the acoustic wave data.

7. The method of claim 5 comprising conducting further operations in the earth formation in dependence upon the at least one property.

8. The method of claim 7 wherein the further operations comprise at least one of: i) geosteering; ii) drilling additional boreholes in the earth formation; iii) performing additional measurements on the earth formation; iv) estimating additional parameters of the earth formation; v) installing equipment in the borehole; vi) evaluating the earth formation; vii) optimizing present or future development in the earth formation or in a similar earth formation; viii) optimizing present or future exploration in the earth formation or in a similar earth formation; ix) drilling the borehole; and x) producing one or more hydrocarbons from the at least one property.

9. The method of claim 1 wherein estimating the location in the earth formation for each reflection point of the plurality of reflection points from the acoustic wave data is free from acoustic migration of acoustic wave data.

10. The method of claim 1 comprising:
generating the acoustic wave data at the at least one acoustic receiver on the logging tool in response to a plurality of acoustic reflections of acoustic waves from a corresponding second plurality of reflection points along a second acoustic reflective boundary responsive to the multipole acoustic signals;
estimating from the acoustic wave data a second location in the earth formation for each reflection point of the second plurality of reflection points; and
using the second location in the earth formation for each reflection point to estimate at least one property of the second acoustic reflective boundary.

11. The method of claim 1 wherein estimating the location in the earth formation for each reflection point comprises:
performing coherence processing on at least a portion of the acoustic wave data to generate a coherence measure for each reflection point dependent on the location of each reflection point; and
identifying at least one of the plurality of acoustic reflections from the coherence measure for each reflection point.

12. The method of claim 11 wherein a plurality of the coherence measures for each reflection point dependent on the location of each reflection point defines a coherence map and wherein identifying the acoustic reflection comprises identifying a local maximum in the coherence map, wherein the local maximum is representative of the acoustic reflection.

13. The method of claim 1 further comprising receiving the at least one property at the surface control unit in near real-time with respect to initiating the generation of the plurality of multipole acoustic signals.

14. A well logging system for logging in a borehole intersecting an earth formation, the well logging system comprising:
a drilling assembly configured for conveyance in the borehole, the drilling assembly comprising a mud pulse telemetry system and a logging tool, wherein the logging tool comprises:
a transmitter configured to generate a plurality of multipole acoustic signals; and
at least one acoustic receiver configured to generate acoustic wave data in response to a plurality of acoustic reflections of acoustic waves from a corresponding plurality of reflection points along an acoustic reflective boundary in the earth formation responsive to the multipole acoustic signals; and
at least one processor on the logging tool configured to automatically characterize the acoustic reflective boundary by:
estimating from the acoustic wave data a location in the earth formation for each reflection point of the plurality of reflection points by;
using the location in the earth formation for each reflection point to estimate at least one property of the acoustic reflective boundary; and
providing the at least one property of the acoustic reflective boundary to the mud pulse telemetry system.

15. The well logging system of claim 14 wherein the processor is further configured to:
perform coherence processing on at least a portion of the acoustic wave data to generate a coherence measure for each reflection point dependent on the location of each reflection point; and
identifying at least one of the plurality acoustic reflections from the coherence measure for each reflection point.

16. The well logging system of claim 15 wherein the processor is further configured to define a coherence map from a plurality of the coherence measures for each reflection point dependent on the location of each reflection point and wherein identifying the acoustic reflection comprises identifying local maximum in the coherence map, wherein the local maximum is representative of the acoustic reflection.

17. The well logging system of claim 14 wherein estimating the at least one property of the acoustic reflective boundary comprises estimating a local dip of the acoustic reflective boundary about a particular reflection point using a location of the transmitter associated with the particular reflection point, a location of a receiver of the at least one acoustic receiver associated with the particular reflection point, and the location within the earth formation of the particular reflection point.

18. The well logging system of claim 17, wherein estimating the at least one property comprises using the local dip to estimate a global dip of the acoustic reflective boundary and estimating at least one additional property, wherein the additional property comprises at least one of: i) an intersection angle between the borehole and the acoustic reflective boundary; and ii) a distance of travel for the tool to meet a reflector-borehole intersection point.

19. The well logging system of claim 18 wherein the at least one property comprises at least one of: i) the location in the earth formation for each reflection point; ii) the location of the acoustic reflective boundary; iii) an intersection angle between the borehole and the acoustic reflective boundary; and iv) a distance of travel for the tool to meet a boundary-borehole intersection point.

20. The well logging system of claim 14 wherein the mud pulse telemetry system is configured to send the at least one property while the drilling assembly is in the borehole.

21. The well logging system of claim 14, wherein estimating the location in the earth formation for each reflection point of the plurality of reflection points from the acoustic wave data is free from acoustic migration of acoustic wave data.

* * * * *